(12) United States Patent
Knauer et al.

(10) Patent No.: US 9,505,503 B2
(45) Date of Patent: Nov. 29, 2016

(54) REACTANTS SPRAYED INTO PLASMA FLOW FOR ROCKET PROPULSION (71) Applicant: Lockheed Martin Corporation, Bethesda, MD (US)

(72) Inventors: Larry D. Knauer, Littleton, CO (US); Edward A. Pierson, Littleton, CO (US); Vadim Khayms, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 180 days.

(21) Appl. No.: 14/223,921

(22) Filed: Mar. 24, 2014

(65) Prior Publication Data

US 2014/0290212 A1   Oct. 2, 2014

Related U.S. Application Data (60) Provisional application No. 61/805,837, filed on Mar. 27, 2013.

(51) Int. Cl.
| | |
|---|---|
| *F03H 1/00* | (2006.01) |
| *B64G 1/40* | (2006.01) |
| *F02K 9/52* | (2006.01) |
| *F02K 9/68* | (2006.01) |
| *F02K 9/26* | (2006.01) |

(Continued)

(52) U.S. Cl.
CPC .......... *B64G 1/406* (2013.01); *F02K 9/26* (2013.01); *F02K 9/42* (2013.01); *F02K 9/44* (2013.01); *F02K 9/52* (2013.01); *F02K 9/60* (2013.01); *F02K 9/68* (2013.01); *F02K 9/82* (2013.01); *F02K 9/94* (2013.01); *F02K 9/95* (2013.01); *F03H 1/00* (2013.01); *F03H 1/0006* (2013.01); *F03H 1/0012* (2013.01); *F03H 1/0025* (2013.01); *F03H 1/0081* (2013.01); *F03H 1/0087* (2013.01); *F03H 1/0093* (2013.01)

(58) Field of Classification Search
CPC ... B64G 1/406; F03H 1/0093; F03H 1/0012; F03H 1/0006; F03H 1/0025; F03H 1/0081; F03H 1/0087; F02K 9/52; F02K 9/68; F02K 9/26; F02K 9/95; F02K 9/94; F02K 9/82; F02K 9/60; F02K 9/44; F02K 9/42
See application file for complete search history.

(56) References Cited

U.S. PATENT DOCUMENTS

| | | | | |
|---|---|---|---|---|
| 2,612,019 | A | * | 9/1952 | Halford ............... F02K 9/50 137/461 |
| 4,800,716 | A | * | 1/1989 | Smith ............... B64G 1/406 219/121.57 |

(Continued)

OTHER PUBLICATIONS

Turner, "Rocket and Spacecraft Propulsion", 2nd edition, 2006, p. 157.*

(Continued)

*Primary Examiner* — Gerald L Sung
*Assistant Examiner* — William Breazeal
(74) *Attorney, Agent, or Firm* — McDermott Will & Emery LLP (57) ABSTRACT

Specific impulse and rocket engine efficiency can be improved by injecting reactants, e.g., a propellant combination or a monopropellant and a catalyst, into a plasma flow of a rocket engine. In some aspects, a catalyst or a propellant is carried by plasma formed by passing a flow of a feed gas through an electrical arc. In some aspects, reactants are combusted in supersonic plasma flow to generate combustion ionization in the plasma flow.

22 Claims, 8 Drawing Sheets (51) Int. Cl.
*F02K 9/95* (2006.01)
*F02K 9/94* (2006.01)
*F02K 9/82* (2006.01)
*F02K 9/60* (2006.01)
*F02K 9/44* (2006.01)
*F02K 9/42* (2006.01)

(56) References Cited

U.S. PATENT DOCUMENTS

| | | | | |
|---|---|---|---|---|
| 4,995,231 | A * | 2/1991 | Smith | B64G 1/406 219/121.51 |
| 5,076,051 | A * | 12/1991 | Naff | B64G 1/406 219/121.51 |
| 6,469,424 | B1 * | 10/2002 | Marable | F02K 9/52 313/120 |
| 7,246,483 | B2 | 7/2007 | Minick et al. | |
| 2007/0164680 | A1 * | 7/2007 | Kumar | B01D 53/92 315/111.21 |

OTHER PUBLICATIONS

Bramanti "Experimental Characterization of Advanced Materials for the Catalytic Decomposition of Hydrogen Peroxide", 2006, 42nd AIAA/ASME/SAE.ASEE Joint Propulsion Conference & Exhibit.*
Bender "Electric Propulsion Development; A Chemical Arc-Jet Rocket Feasibilty Study", 1962, vol. 9, pp. 95-96.*
Storm and Cappelli "Arcjet nozzle flow-field characterization by laser-induced flourenscence", 1998, Applied Optics, vol. 37, No. 3.*
Zuckerwar, "Handbook of the Speed of Sound in Real Gases", 2002.*
NASA, "Specific Impulse", 2009.*
Neff, K., et al, "High Performance Green Propellant for Satellite Applications," 45th AIAA/ASME/SAE/ASEE Joint Propulsion Conference & Exhibit, Aug. 2-5, 2009.
Scharlemann, C., "Experimental Verification of Green Propellant Candidates—An Overview of GRASP Activities," ID 367, 4th European Conference for Aerospace Sciences, St. Petersburg, Russia, 2011.
Tanaka, N., et al., "The 'Greening' of Spacecraft Reaction Control Systems," Mitsubishi Heavy Industries Technical Review, vol. 48, No. 4, pp. 44-50, Dec. 2011.
Hawkins, T.W., et al., "Reduced Toxicity, High Performance Monopropellant at the U.S. Air Force Research Laboratory," Technical Paper, Air Force Laboratory, Apr. 27, 2010.
Romeo, L., et al., "Performance of Different Catalysts Supported on Alumina Spheres for Hydrogen Peroxide Decomposition," AIAA 2007-5466, 43rd AIAA/ASME/SAE/ASEE Joint Propulsion Conference & Exhibit, Jul. 8-11, 2007, Cincinnati Ohio.
Lin, S., et al., "Catalytic Decomposition of Hydrogen Peroxide on Iron Oxide: Kinetics, Mechanism, and Implications," Environmental Science & Technology, 1998, vol. 32, No. 16, pp. 1417-1423.
Lohner, K.A., et al., "Nitrous Oxide Monopropellant Gas Generator Development," JANNAF / 3rd Spacecraft Propulsion Joint Subcommittee Meeting, Dec. 2008.
Garwig, Paul L., "Heterogeneous Decomposition of Hydrogen Peroxide by Inorganic Catalysts," FMC Corporation, Chemical Research and Development Center, Technical Report AFRPL-TR-66-136, Apr. 25, 1972.
Bramanti, et al., "Experimental Characterization of Advanced Materials for the Catalytic Decomposition of Hydrogen Peroxide;" 42nd AIAA/ASME/SAE/ASEE Joint Propulsion Conference & Exhibit, Jul. 9-12, 2006, 12 pages.
Cervone, et al., "Development of Hydrogen Peroxide Monopropellant Rockets;" 42nd AIAA/ASME/SAE/ASEE Joint Propulsion Conference & Exhibit, Jul. 9-12, 2006, 11 pages.
Rusek, John J., "Hydrogen Peroxide for Rocket Propulsion Applications;" Technical Paper, Dec. 1995, 16 pages, Phillips Laboratory Propulsion Directorate.
Chan, et al., "Preliminary Development of a Hydrogen Peroxide Thruster;" World Academy of Science, Engineering and Technology, 2013, pp. 1180-1187.
Krishnan, et al., "Design and Development of a Hydrogen-Peroxide Rocket-Engine Facility;" <http://propulsion-skrishnan.com/pdf/H2O2%20Thruster%20Design.pdf>, accessed on Apr. 17, 2014, 10 pages.
Lin, et al, "Catalytic Decomposition of Hydrogen Peroxide on Iron Oxide: Kinetics, Mechanism, and Implications," Environ. Sci. Technol, 1998, vol. 32, No. 10, pp. 1417-1423.

* cited by examiner

REACTANTS SPRAYED INTO PLASMA FLOW FOR ROCKET PROPULSION

CROSS-REFERENCE TO RELATED APPLICATION

This application claims the priority benefit of U.S. Provisional Patent Application No. 61/805,837, filed Mar. 27, 2013, titled PLASMA SPRAYED CATALYST FOR ROCKET PROPULSION, the entirety of which is incorporated by reference herein.

STATEMENT REGARDING FEDERALLY SPONSORED RESEARCH OR DEVELOPMENT

Not applicable.

FIELD OF THE INVENTION

The present invention generally relates to rocket engines, including, for example, engines for catalyst-activated propellant and bipropellants engines.

BACKGROUND

Traditional propulsion systems for catalyst-activated propellants pass a monopropellant through a fine-mesh screen or other fixed element coated with a catalyst that initiates an exothermic reaction that disassociates the propellant into one or more high temperature products that are expelled through a nozzle. An example engine may use hydrazine as the monopropellant and iridium as the catalyst, wherein the decomposition produces a 1000° C. gas that is a mixture of nitrogen, hydrogen, and ammonia.

Arcjet engines create an electric discharge, or "arc," in the flow of propellant which accelerates the propellant at the expense of the power and weight of the equipment that creates the arc.

SUMMARY OF THE INVENTION

It is desirable to increase the thrust of a rocket engine by increasing the specific impulse (Isp) of the propellant(s) used by the engine. Some aspects of subject technology involve the recognition that a sufficient increase in the thrust may allow safer and/or less expensive rocket engines to replace of rocket engines that are less safe and/or more expensive.

Isp is the ratio of the force (thrust) produced to the weight flow of the propellant, and is related to the total thrust F by the equation:

$$F = I_{sp} \dot{m} g_0 \qquad (1)$$

wherein $\dot{m}$ is the total mass flow rate of the propellant into the reaction chamber and $g_0$ is the acceleration due to gravity at the Earth's surface. A conventional hydrogen peroxide engine will have an Isp of approximately 215 seconds. The Isp of a hydrazine engine may approach 230 seconds as the ammonia product from hydrazine disassociation can be accelerated to higher velocities than water vapor product of hydrogen peroxide disassociation. Arcjet versions of a hydrazine engine may increase the efficiency and approach an Isp of 550 seconds by electrically energizing the flow and accelerating the reaction product ammonia to a higher velocity. Arcjets typically have much lower thrust than pure chemical thrusters because of the electrical energy it takes to energize the combustion products.

Handling of the rocket fuel, e.g., hydrazine, used on modern spacecraft poses a number of challenges, primarily associated with the risk of exposure of the ground personnel to the toxic fumes. Satellite primes and engine suppliers have long been searching for alternative propellants to mitigate these impacts. In some aspects of the subject technology, having a less toxic, but high-performing propellant would reduce both cost and risk associated with propellant transport and storage, cleanup of accidental releases, human exposure to toxic substances, and the infrastructure required to handle hazardous propellants.

Hydrogen peroxide can be used in high concentrations as an alternative to hydrazine. At concentrations of hydrogen peroxide over 80% the heat of decomposing peroxide becomes large enough to produce adequate thruster performance; however, it also can make explosive decomposition very hazardous. Thus, ground personnel may still be required to take special precautions.

Catalytic reactions with lower hydrogen peroxide concentrations utilizing silver catalyst mesh may improve Isp, but can encounter challenges such as a) relatively poor performance (maximum theoretical specific impulse of only ~160 sec) and b) significant life limitations due to the slow consumption of the catalyst over the course of thruster operation.

In some aspects of the subject technology, introducing a flow of catalyst particulates into a plasma flow field and reacting the catalyst particulates with a propellant in the plasma flow field can improve the Isp of the reaction of the propellant with the catalyst.

In some aspects of the subject technology, injection of reactants into a supersonic plasma flow field, and combustion ionization of the injected reactants in the plasma flow field can improve the Isp of the reactants. In some aspects of the subject technology, the reactants can be any propellant combination.

In some aspects of the subject technology, small quantities of silver powder are delivered and injected into a reaction area, e.g., a reaction chamber, and mixed with low-concentration peroxide (e.g., 30% or lower) with the aid of low-energy argon plasma.

In some aspects of the subject technology, combustion decomposition of hydrogen peroxide with silver in the presence of the supersonic zone of a plasma stream can couple combustion energy (formation of ions) kinetics with the plasma electrical energy, yielding very high engine efficiency.

Without being bound by any particular theory or mechanism of action, in some aspects of the subject technology the action of the plasma can be two-fold: a) it can enhance the mixing of a catalyst with a propellant, thus reducing the amount of catalyst required to achieve nearly full decomposition, and 2) can augment the decomposition reaction by adding more energy to the propellant and reaction products, thus raising the overall temperature of the gas in the reaction chamber and improving the performance of the engine.

In some aspects of the subject technology, injection of a catalyst advantageously permits elimination of a consumable catalyst bed from a catalyst-activated propulsion system. In systems employing a catalyst bed, the service life is adversely affected by degradation of the catalyst bed with use.

In some aspects of the subject technology, a propulsion system is disclosed that includes a reaction chamber, an injector for introducing to the reaction chamber a flow comprising a propellant into a flow of plasma, and a sprayer or other injector configured to deliver, e.g., emit, a flow of particles of a catalyst into the flow of plasma.

In some aspects of the subject technology, a propulsion system is disclosed that includes a reaction chamber, an injector for introducing to the reaction chamber a flow comprising a monopropellant, and a sprayer or other injector configured to deliver, e.g., emit, a flow of plasma comprising particles of a catalyst selected to induce disassociation of the monopropellant.

In some aspects of the subject technology, a propulsion system is disclosed that includes a reaction chamber, an injector for introducing to the reaction chamber a flow comprising a monopropellant, and a sprayer or other injector configured to pass a flow of a gas mixture through an electrical arc so as to create a flow of plasma and to introduce a flow of particles of a catalyst selected to induce disassociation of the monopropellant into the flow of plasma, thereby melting the particles, and introducing the flow of the plasma carrying the molten particles into the reaction chamber such that the particles are mixed with the propellant.

In some aspects of the subject technology, a propulsion system comprises a passage, a plasma flow generator, and a plurality of injectors. The passage can comprise a reaction chamber, and can be formed, at least partially, by a divergent nozzle. The plasma flow generator can be positioned to direct a flow of plasma into the reaction chamber and through the divergent nozzle. The plurality of injectors can be positioned to deliver at least two reactants into the plasma flow at a region in the reaction chamber where the plasma flow is supersonic. In some aspects, the reactants can comprise a propellant and a catalyst. In some aspects, the reactants can be bipropellants. Some or all of the reactants can be delivered into an electrical arc of the plasma flow generator. Various configurations, positions, and orientations of the plurality of injectors are possible.

In some aspects of the subject technology, a method, of generating thrust, can comprise directing a plasma flow into a reaction chamber, injecting a first reactant and a second reactant to the plasma flow at a region in the reaction chamber where the plasma flow is supersonic, reacting the first reactant and the second reactant in the supersonic plasma flow to generate combustion ionization, and accelerating byproducts through a divergent nozzle. In some aspects, the reactants can comprise a propellant and a catalyst. In some aspects, the reactants can be bipropellants. Some or all of the reactants can be delivered into an electrical arc of the plasma flow generator.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding of the subject technology and are incorporated in and constitute a part of this description, illustrate aspects of the subject technology and, together with the specification, serve to explain principles of the subject technology.

DETAILED DESCRIPTION OF THE INVENTION

The detailed description set forth below is intended as a description of various configurations of the subject technology and is not intended to represent the only configurations in which the subject technology may be practiced. The detailed description includes specific details for the purpose of providing a thorough understanding of the subject technology. However, the subject technology may be practiced without some of these specific details. In some instances, well-known structures and components are not shown, or are shown schematically or in block diagram form, to avoid obscuring the concepts of the subject technology.

Reference is made in detail to aspects of the subject technology, examples of which are illustrated in the accompanying drawings, wherein like reference numerals refer to like elements throughout.

In some aspects of the subject technology, reactants can be reacted to produce byproducts by spraying the reactants into a plasma flow field in a reaction chamber of a rocket engine. In some aspects of the subject technology, a propellant can be disassociated into reaction products by spraying a catalyst and the propellant into a plasma flow field in a reaction chamber of a rocket engine.

In some aspects of the subject technology, the available surface area of a catalyst as well as the exposure of a propellant to the catalyst is improved, as compared to an erodible mass of catalyst, by spraying fine particles of the catalyst into the flow of injected propellant within a reaction chamber, thereby distributing the catalyst particles in a reaction area with the propellant. In some aspects of the subject technology, the catalyst is introduced into the reaction chamber using a plasma generator that produces a flow of plasma that melts the catalyst particles, which may further reduce the particle size and increase the reactivity of the exposed catalyst. In some aspects of the subject technology, plasma is produced by a feed gas passing through an arc created between a pair of electrodes.

The following terms carry specific definitions within this application. The term "disassociation" means the conversion of one material, such as, for example, hydrogen peroxide, into one or more product materials, such as, for example, water vapor and oxygen, and is considered to be equivalent to the terms "decomposition," "conversion," and the like. Disassociation may be initiated by a catalyst and may be an exothermic reaction. The term "propellant" means any material that may be provided into the engine and converted to one or more product materials in an exothermic reaction. Propellants include, for example, monopropellants, fuels, and oxidizers, and the like.

Figure 1:
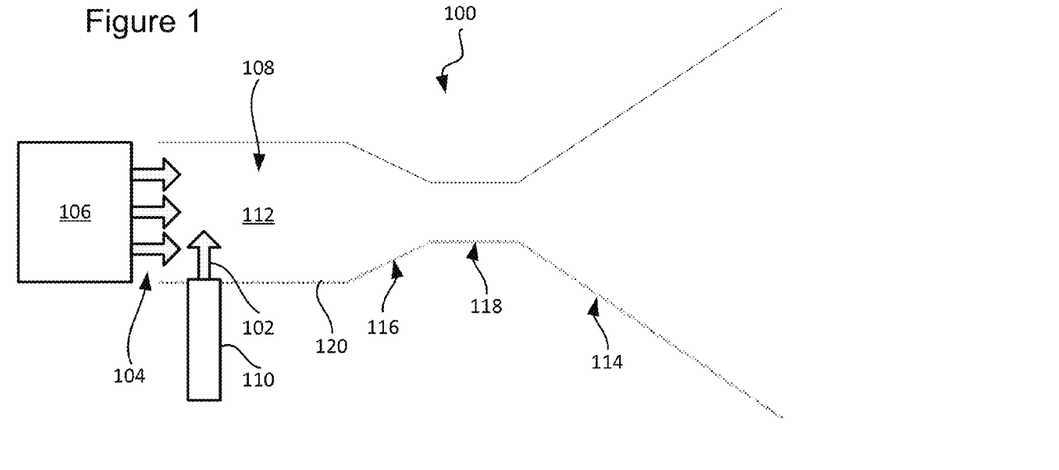
FIGS. 1-3 are schematic longitudinal cross-sectional views of exemplifying propulsion systems illustrating orientations of injector for delivering reactants into plasma flow, according to various aspects of the subject technology.
Figure 2:
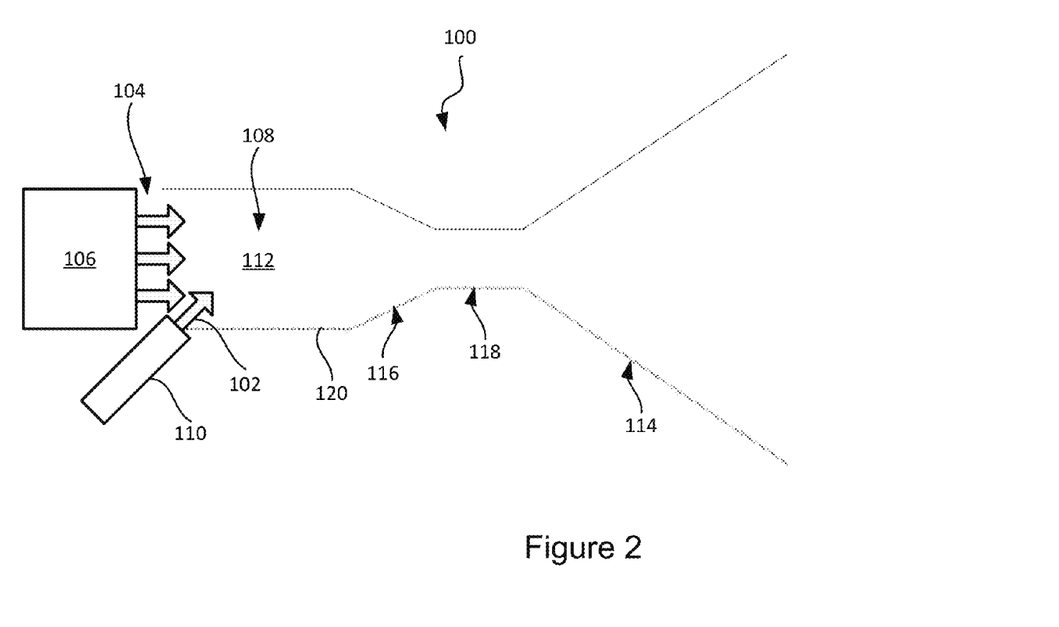
Figure 3:
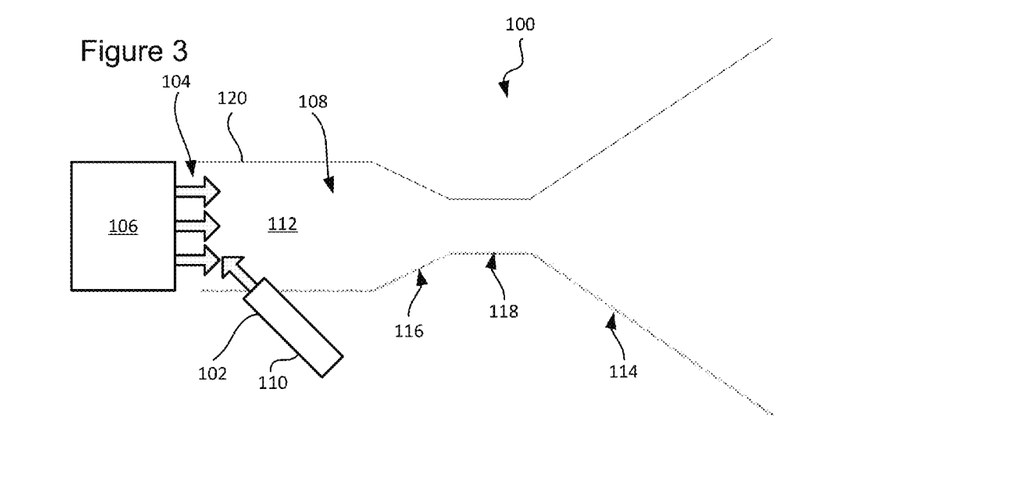
Figure 16:
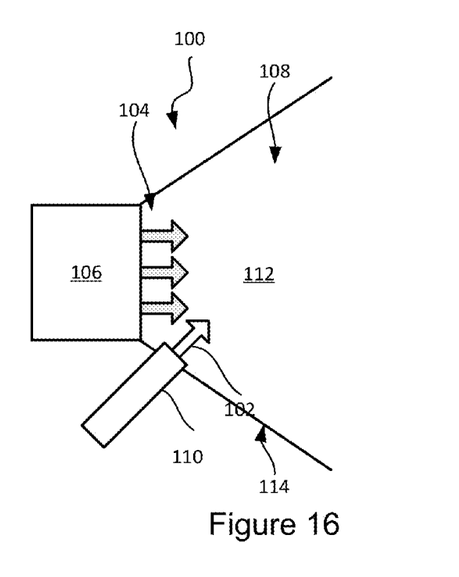
Figure 17:
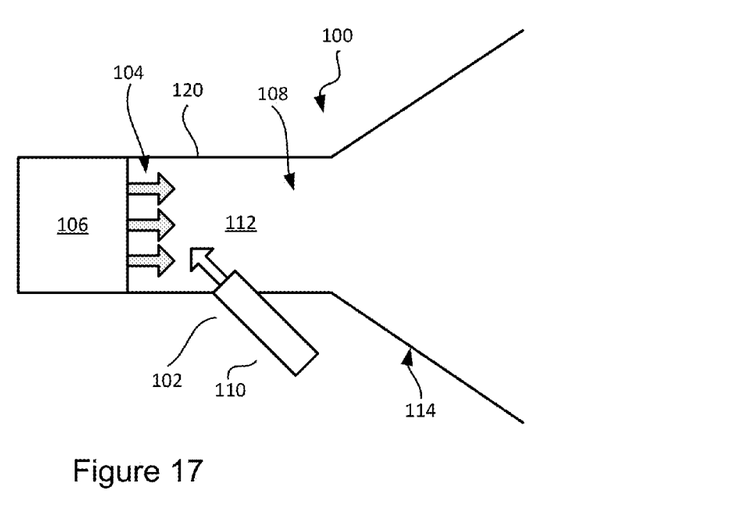

FIGS. 1-3 are schematic longitudinal cross-sectional views of exemplifying propulsion systems 100 illustrating various orientations of injection of reactants 102 into plasma flow 104 relative to a plasma flow direction, according to various aspects of the subject technology. The propulsion systems 100 illustrated in FIGS. 1-3 each comprise a plasma generator 106, a passage 108, and one or more reactant injectors 110. The passage 108 comprises a reaction chamber 112, and is at least partially defined by a divergent nozzle 114. In some aspects of the subject technology, the passage can comprise a convergent nozzle 116 and a throat 118, as illustrated, for example, in any of FIGS. 1-3 and 7-9. In some aspects of the subject technology, the passage can omit a convergent nozzle, as illustrated, for example, in any of FIGS. 15-17. In some aspects of the subject technology, the passage can omit a convergent nozzle and can comprise a cylindrical portion upstream of a divergent nozzle 114, as illustrated, for example, in FIG. 15 or 16.

In some aspects of the subject technology, the reactant injectors 110 are oriented to direct the reactants into the plasma flow 104 in a direction nominally normal to a direction of plasma flow, for example, as illustrated in FIG. 1. In some aspects of the subject technology, the reactant injectors 110 are oriented to direct the reactants into the plasma flow 104 in a downstream direction between 0 degrees and 90 degrees relative to a plasma flow direction or a central axis of the passage 108, for example, as illustrated in FIG. 2. In some aspects of the subject technology, the reactant injectors 110 are oriented to direct the reactants into the plasma flow 104 in an upstream direction between 0 degrees and 90 degrees relative to a plasma flow direction or a central axis of the passage 108, for example, as illustrated in FIG. 3.

Figures 4, 5, 6:
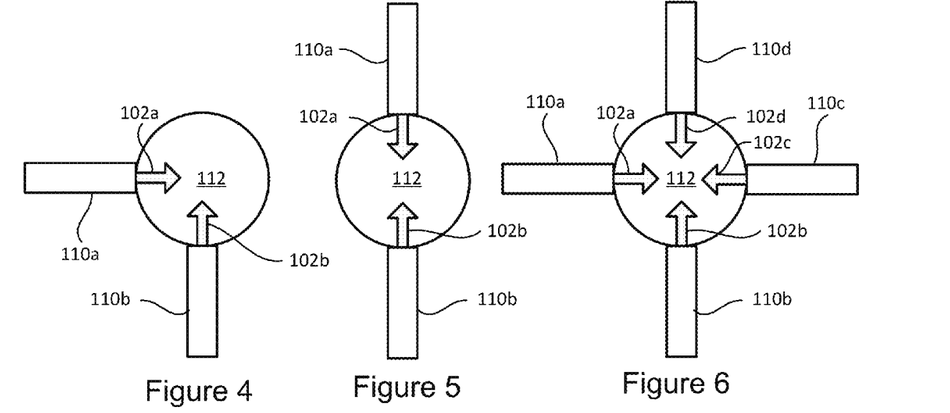
FIG. 4-6 are schematic transverse cross-sectional views of exemplifying propulsion systems illustrating orientations injectors for delivering reactants into a reaction chamber, according to various aspects of the subject technology.

FIGS. 4-6 are schematic transverse cross-sectional views of exemplifying arrangements of reactant injectors 110 about the reaction chamber 112, according to various aspects of the subject technology. FIG. 4 illustrates a first reactant injector 110a and a second reactant injector 110b positioned and oriented to deliver a first reactant 102a and a second reactant 102b into the reaction chamber 112 in nominal directions appearing perpendicular to each other when viewed in a direction of plasma flow, according to some aspects of the subject technology.

FIG. 5 illustrates a first reactant injector 110a and a second reactant injector 110b positioned and oriented to deliver a first reactant 102a and a second reactant 102b into the reaction chamber 112 in nominal directions appearing parallel and opposed to each other when viewed in a direction of plasma flow, according to some aspects of the subject technology.

FIG. 6 illustrates a first reactant injector 110a, a second reactant injector 110b, a third reactant injector 110c, and a fourth reactant injector 110d positioned around the reaction chamber 112, according to some aspects of the subject technology. In FIG. 6, the first reactant injector 110a and the third reactant injector 110c are positioned and oriented to deliver a first reactant 102a and a third reactant 102c, respectively, into the reaction chamber 112 in nominal directions appearing parallel and opposed to each other when viewed in a direction of plasma flow. FIG. 6 also shows the second reactant injector 110b and the fourth reactant injector 110d positioned and oriented to deliver a second reactant 102b and a fourth reactant 102d, respectively, into the reaction chamber 112 in nominal directions appearing parallel and opposed to each other when viewed in a direction of plasma flow. FIG. 6 also shows the nominal delivery directions of the first reactant 102a and the third reactant 102c as perpendicular to the delivery directions of the second reactant 102b and the fourth reactant 102d when viewed in a direction of plasma flow. In some aspects, the first reactant 102a and third reactant 102c comprise the same reactant material, while the second reactant 102b and the fourth reactant 102d comprise the same reactant material. In some aspects, the first reactant 102a and second reactant 102b comprise the same reactant material, while the third reactant 102c and the fourth reactant 102d comprise the same reactant material.

As will be readily understood by one of skill in the art, any of the disclosed longitudinal-plane orientations, e.g., as illustrated in FIGS. 1-3 or described herein can be combined with any of the longitudinal positions disclosed herein, the disclosed transverse-plane orientations, e.g., as illustrated in any of FIG. 4-6 or 10 or described herein, for any reactant injector 110 or combination of reactant injectors 110, and with any of the disclosed passage configurations, e.g., as illustrated in FIG. 1-3, 7-9, 11-13, or 15-17, or described herein. Reactant injectors 110 of the same propulsion system 100 can be positioned and oriented according to different combinations of the disclosed longitudinal orientations and the disclosed transverse orientations.

Figure 7:
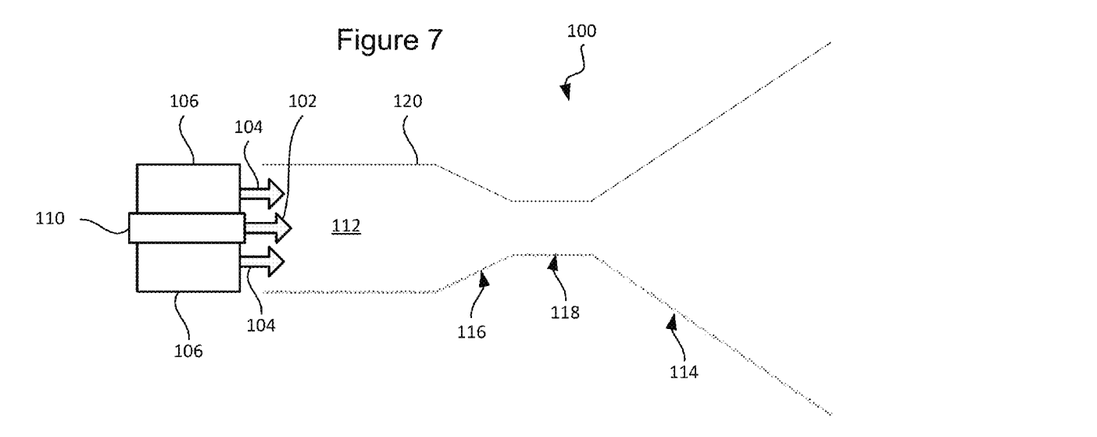
FIG. 7 is a schematic longitudinal cross-sectional view of an exemplifying propulsion system illustrating injection of reactants into a plasma flow in a direction generally parallel to a plasma flow direction, according to some aspects of the subject technology.

FIG. 7 shows an exemplifying propulsion system 100 illustrating injection of reactants 102 into a plasma flow 104 in a direction generally or nominally parallel to a direction of plasma flow 104, according to some aspects of the subject technology.

Figure 8:
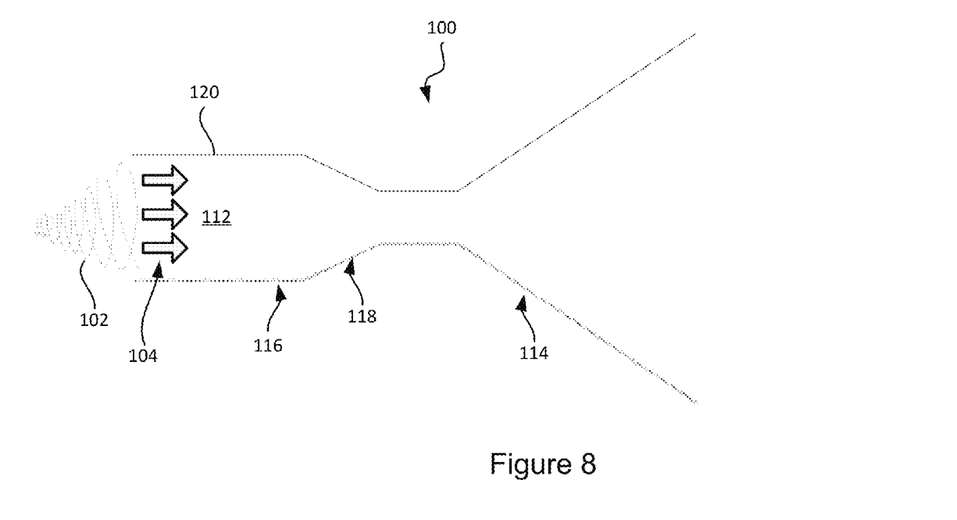
FIG. 8 is a schematic longitudinal cross-sectional view of an exemplifying propulsion system illustrating spiral injection of reactants into a plasma flow about a plasma flow direction, according to some aspects of the subject technology.

FIG. 8 shows an exemplifying propulsion system 100 illustrating spiral injection of reactants 102 into a plasma flow 104 about a direction of plasma flow 104, according to some aspects of the subject technology.

Figure 9:
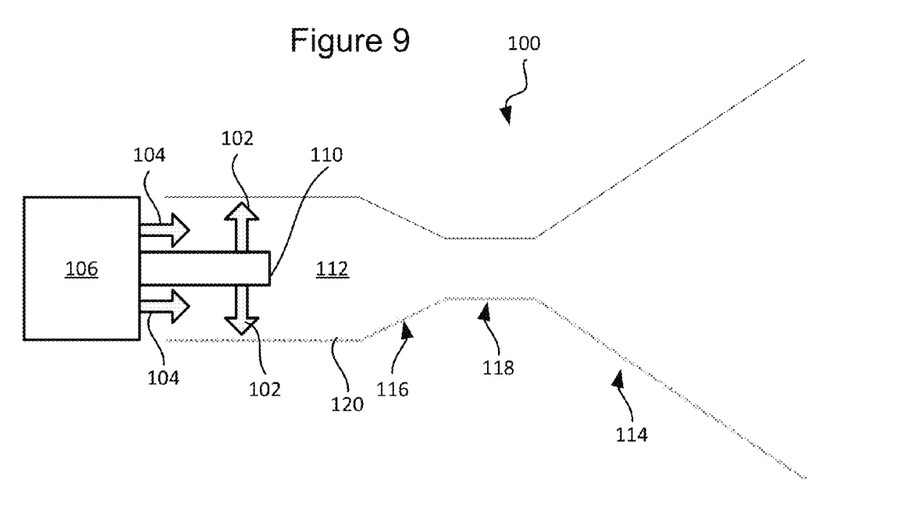
FIG. 9 is a schematic longitudinal cross-sectional view of an exemplifying propulsion system showing generally radial diffusion of reactants into a plasma flow relative to a plasma flow direction, according to some aspects of the subject technology.
Figure 10:
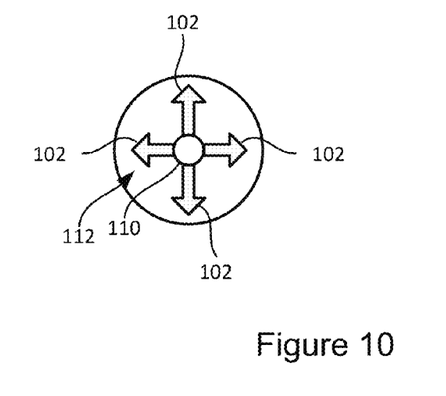
FIG. 10 is a schematic transverse cross-sectional view of the propulsion system of FIG. 9, illustrating generally radial diffusion of reactants into a plasma flow relative to a plasma flow direction, according to some aspects of the subject technology.

FIGS. 9 and 10 show an exemplifying propulsion system 100 illustrating radial injection of reactants 102 into a plasma flow 104 relative to a direction of plasma flow 104, according to some aspects of the subject technology. The reactants 102 can be radially injected into the plasma flow 104 by, for example, gas diffusion injection.

As will be readily understood by one of skill in the art, the reactant injectors 110 or combination of reactant injectors 110 can be positioned and oriented according to any of the aspects, embodiments, or examples provided herein. For example, injectors 110 for delivering the different reactants can have the same or different longitudinal positions and orientations while having the same or different circumferential positions and orientations. As another example, where multiple injectors 110 deliver the same reactants, the multiple injectors delivering the same reactants can have the same or different longitudinal positions and orientations while having the same or different circumferential positions and orientations. Reactant injectors 110 of the same propulsion system 100 each can be positioned and oriented according to different combinations of the disclosed longitudinal orientations and the disclosed transverse orientations. Each reactant can be injected into the plasma flow 104 by one or more injectors 110.

Figure 11:
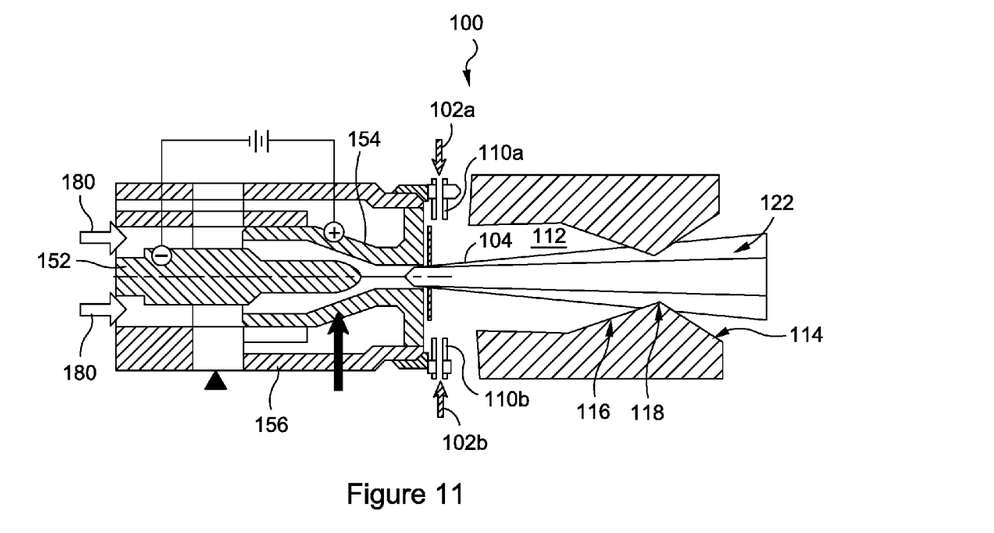
FIG. 11 is a schematic longitudinal cross-sectional view of an exemplifying propulsion system illustrating injection of reactants into a plasma flow in a direction normal to a plasma flow direction, and illustrating aspects of an exemplifying plasma generator, according to some aspects of the subject technology.

FIG. 11 shows a propulsion system 100 exemplifying some aspects of the subject technology. The propulsion system 100 of FIG. 11 comprises a plasma generator 106, a passage 108, a first reactant injector 110a, and a second reactant injector 110b. The passage 108 comprises a reaction chamber 112, and is at least partially defined by a divergent nozzle 114. The passage in FIG. 11 also comprises a convergent nozzle 116. The first reactant injector 110a is configured to inject a first reactant 102a into the reaction chamber 112. The second reactant injector 110b is configured to reject a second reactant 102b into the reaction chamber 112. In some aspects of the subject technology, the first reactant 102a is a catalyst-activated propellant, e.g., hydrogen peroxide, and the second reactant 102b is a catalyst, e.g., silver.

In some aspects, the catalyst is a powder, and the second reactant injector 110b is configured to spray the powder with a carrier gas into the plasma flow. In some aspects, the catalyst is a metal organic precursor, and the second reactant injector 110b is configured to spray the metal organic precursor as a gas liquid into the plasma flow.

In some aspects of the subject technology, the first reactant 102a is a first propellant, e.g., a fuel, and the second reactant 102b is a second propellant, e.g., an oxidizer, and the first reactant injector 110a and the second reactant injector 110b are configured to deliver, e.g., spray, the first propellant 102a and the second reactant 102b, respectively, into the reaction chamber 112.

The first reactant 102a and the second reactant 102b can be injected into the plasma flow 104 upstream of the divergent nozzle 114 (as illustrated, for example, in FIGS. 11, 12, 15, and 17), downstream of an upstream end of the divergent nozzle 114 (as illustrated, for example, in FIG. 16), in a throat, or a combination thereof. In some aspects, one of the reactants can be injected upstream of the divergent nozzle while another reactant is injected into the plasma flow downstream of an upstream end of the divergent nozzle. In some aspects, some or all of the reactants can be injected into the plasma flow at the upstream end of the divergent nozzle or in a throat 118 (FIGS. 1-3 and 7-9). In some aspects, some or all of the reactants can be injected at multiple locations, e.g., spaced locations, along the passage 108. In some aspects of the subject technology, the first reactant 102a and the second reactant 102b injected such that the reactants react in a supersonic region of the plasma flow 104. In some aspects of the subject technology, the first reactant 102a and the second reactant 102b are both injected into a supersonic region of the plasma flow 104, which can be, for example, in a throat or a divergent nozzle.

In some aspects of the subject technology, the reaction chamber 112 is defined at least in part by the divergent nozzle 114. In some aspects of the subject technology, the reaction chamber 112 is wholly within the divergent nozzle 114. In some aspects of the subject technology, the reaction chamber 112 is partially or entirely upstream of the divergent nozzle 114. In some aspects of the subject technology, the reaction chamber 112 is at least partially defined by a cylindrical wall 120 (see FIGS. 1-3 and 7-9), a convergent nozzle 116, or both. A cylindrical wall 120, a convergent nozzle 116, or both can be omitted in some aspects of the subject technology, as illustrated, for example in any of FIGS. 15-17. In some aspects of the subject technology that omit a convergent nozzle, the reaction chamber 112 can be at least partially defined by a cylindrical wall, e.g., cylindrical wall 120. In some such a cases, the cylindrical wall can be immediately proximally adjacent an upstream end of a divergent nozzle 114.

In some aspects of the subject technology, the throat 118 can have a length that is approximately equal to its maximum cross-sectional dimension, e.g., diameter. In some aspects, the throat can have a length that is greater or less than its maximum cross-sectional dimension.

The plasma generator 106 creates a plasma flow 104. In some aspects of the subject technology, the plasma generator 106 comprises a pair of electrodes 152, 154, and a housing 156. A flow of a feed gas 180 moves through the housing 156 between the electrodes 152, 154. The electrodes are electrically charged such that an arc (not shown) is formed between them. The arc converts the feed gas into high-temperature plasma, such as, for example, at 28,000° C., and accelerates the plasma flow 104 into the reaction chamber 112. In some aspects, the electrodes can have an input power of up to 400 kW, for example. In some aspects, the electrodes can have an input power greater than 400 kW. In some aspects of the subject technology, the plasma generator 106 outputs a supersonic plasma flow 104. In some cases wherein the plasma generator 106 outputs a supersonic plasma flow 104, a convergent nozzle 116 is omitted.

In some aspects of the subject technology, the feed gas 180 can be any inert gas, such as, for example, argon. In some aspects, the feed gas is a mixture of gases, e.g., of nitrogen and hydrogen. In some aspects, the feed gas can have an input feed pressure of 50 to 200 pounds per square inch (psi), for example. In some aspects, the feed gas can have a flow rate of 40 to 300 SCFH, for example.

The first reactant 102a, e.g., hydrogen peroxide, and the second reactant 102b, e.g., catalyst particles, are injected into the plasma flow 104 from the injectors 110b. In some aspects wherein the second reactant 102b comprises a catalyst, the catalyst particles are melted by the plasma 104 and may be further divided into smaller particles, thereby further increasing the surface area of the catalyst. The first reactant 102a and the second reactant 102b mix in the plasma flow 104, causing an exothermic reaction of the reactants 102. For example, in some aspects, a hydrogen peroxide propellant will disassociate into high temperature water vapor and oxygen. The hot reaction products are expelled from an exhaust port 122, thereby producing thrust. In some aspects wherein the second reactant 102b comprises a catalyst, finely divided catalyst particles may be electrically charged and/or heated by the plasma 104 such that the disassociation process is more complete, thereby increasing the Isp of the propellant.

In some aspects of the subject technology, the first reactant 102a can be a catalyst-activated propellant and the second reactant 102b can be a catalyst. In some aspects of the subject technology, a catalyst-activated propellant as the first reactant 102a can comprise one or more, including combinations, of hydrogen peroxide, hydrogen peroxide-based propellants, hydroxylammonium nitrate (HAN), HAN-based propellants, ammonium dinitramide (AND), ADN-based propellants, hydrazinium nitroformate (HNF), HNF-based propellants, dibutyl ether, diethylenetriamine, heptane, triethylamine, ammonium nitrate, ammonium nitrate-based propellants, butane, dimethylether, nitrous oxide, d-Limonene, ethanol, octane, isopropyl alcohol, propyl ether, kerosene (Jet-A1), tetramethylethylenediamine, turpentine, HDPE, propyl amine, HTPB, methane, methanol, ammonia, and nitrous oxide. In some aspects of the subject technology, a catalyst as the second reactant 102b can comprise one or more, including combinations, of Ag, $Ag_2O$, $Ca(MnO_4)_2$, $CrO_2$, $Cr_2O_3$, Fe, compounds of Fe, K, Ir, MnO, $Mn_2O_3$, $MnO_2$, $PbO_2$, $Pb_2O_3$, $Pb_3O_4$, PbO, Pd, Pt, Ru and compounds, $V_3O_5$, and $VO_2$. Other combinations of propellant and catalyst can be used in some aspects of the subject technology. Although active catalyst materials have been identified, passive catalyst materials can be used in some aspects of the subject technology. Metallic and/or ceramic substrates and carriers can be used in some aspects of the subject technology. Combinations or mixtures of propellants and/or composite catalysts made out of a combination of constituents identified herein can be employed in some aspects of the subject technology. In some aspects of the subject technology, sprayed catalysts, including, for example, powders, can be used in addition to screens, plates, and other consumed and/or eroded catalyst delivery mechanisms.

In some aspects of the subject technology, the use of an electrically energized plasma spray to deliver a catalyst, e.g., silver, and/or mixing of a catalyst with a catalyst-activated propellant, e.g., hydrogen peroxide, in electrically energized plasma can increase the reactivity of the catalyst, energize the reaction products, or both, thereby further increasing the velocity of the reaction products. In some aspects, some or all of these benefits can be obtained using combinations of catalyst-activated propellants and catalysts other than hydrogen peroxide and silver, such as, for example, those identified herein.

In some aspects of the subject technology, the use of silver as a catalyst and hydrogen peroxide as a catalyst-activated propellant advantageously can some or all of the following benefits: cost savings associated with handling and processing toxic propellants, reduced risk personnel during ground processing and propellant loading, operation in either or both of atmosphere and hard vacuum, utilization of on-board power to provide improved performance over existing hydrazine systems.

In some aspects of the subject technology, spraying catalyst into the reaction chamber can enhancing mixing, improve propellant utilization, reduce or minimize the amount of catalyst consumed, or a combination thereof. For example, in some aspects, catalyst consumption can be reduced to 10 pound of silver per thousand pounds of hydrogen peroxide or less, 5 pound of silver per thousand pounds of hydrogen peroxide or less, or 1 pound of silver per thousand pounds of hydrogen peroxide or less.

In some aspects of the subject technology, propulsion systems can be operated either in a low-power/low-Isp mode for systems with limited power availability, or at high power/high-Isp where increased performance may benefit a mission.

In some aspects, the subject technology leverages interaction of catalytic decomposition and plasma heating to improve coupling efficiency of the electrical power from the plasma source to the working fluid.

In some aspects, the subject technology allows an electrically augmented system to operate in ambient atmosphere. In contrast, most electric propulsion systems require hard vacuum for long-term, stable operation.

In some aspects of the subject technology, the first reactant 102a can be a fuel and the second reactant 102b can be an oxidizer. In some aspects of the subject technology, a fuel as the first reactant 102a can comprise one or more, including combinations, of hydrogen peroxide, hydrogen peroxide-based propellants, hydroxylammonium nitrate (HAN), HAN-based propellants, ammonium dinitramide (AND), ADN-based propellants, hydrazinium nitroformate (HNF), HNF-based propellants, dibutyl ether, diethylenetriamine, heptane, triethylamine, ammonium nitrate, ammonium nitrate-based propellants, butane, dimethylether, nitrous oxide, d-Limonene, ethanol, octane, isopropyl alcohol, propyl ether, kerosene (Jet-A1), tetramethylethylenediamine, turpentine, HDPE, propyl amine, HTPB, methane, methanol, ammonia, nitrous oxide, dimethyl ether, hydrogen, kerosene, ethanol, methane, and hydrocarbons. In some aspects of the subject technology, an oxidizer as the second reactant 102b can comprise one or more, including combinations, of oxygen, nitrous oxide, and hydrogen peroxide. Other combinations of fuel and oxidizer can be used in some aspects of the subject technology. In some aspects of the subject technology, tripropellants can be used.

In some aspects of the subject technology, a propellant can be used as the feed gas 180 passing through the electrical arc of the plasma generator 106. In some aspects of the subject technology, a propellant can be injected into a reaction chamber 112 with a plasma-sprayed catalyst. In some aspects of the subject technology, a fuel and oxidizer can be applied in a similar fashion to increase the efficiency of a bi-propellant rocket engine.

Figure 12:
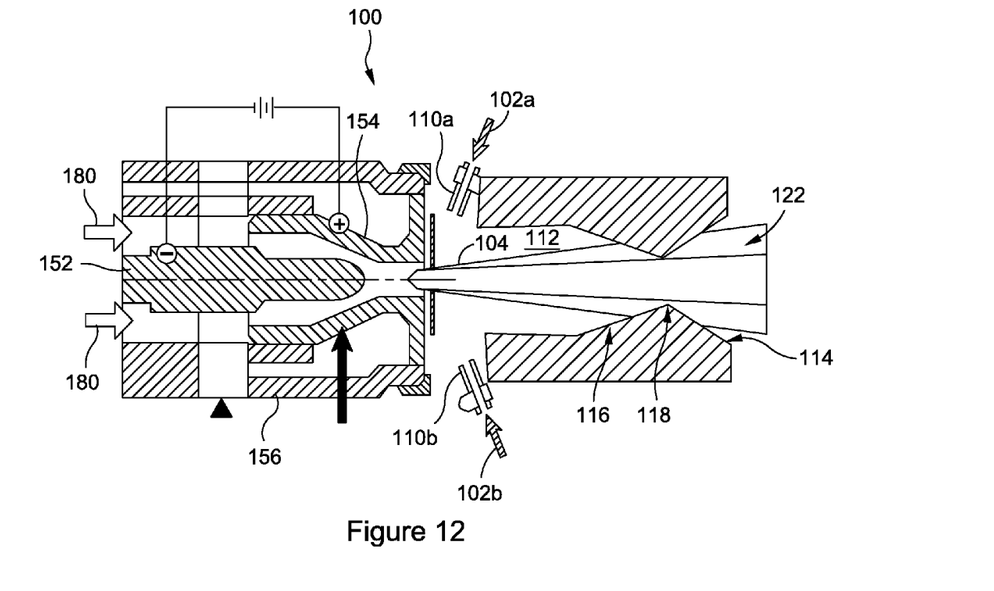
FIG. 12 is a schematic longitudinal cross-sectional view of an exemplifying propulsion system illustrating injection of reactants into a plasma flow in an upstream direction between 0 degrees and 90 degrees relative to a plasma flow direction or a central axis of a flow passage, and illustrating aspects of an exemplifying plasma generator, according to some aspects of the subject technology.

FIG. 12 shows a propulsion system 100 exemplifying some aspects of the subject technology. FIG. 12 is similar to FIG. 11 in many respects, yet differs in that the first reactant injector 110a and the second reactant injector 110b are inclined relative to the direction of plasma flow 104 such that the first reactant 102a and the second reactant 102b are injected upstream into the plasma flow 104 at an angle between 0 degrees and 90 degrees relative to a plasma flow direction or a central axis of the passage 108. In some aspects of the subject technology, the angle of injection has an upstream component, for example, as illustrated in FIG. 12.

Figure 13:
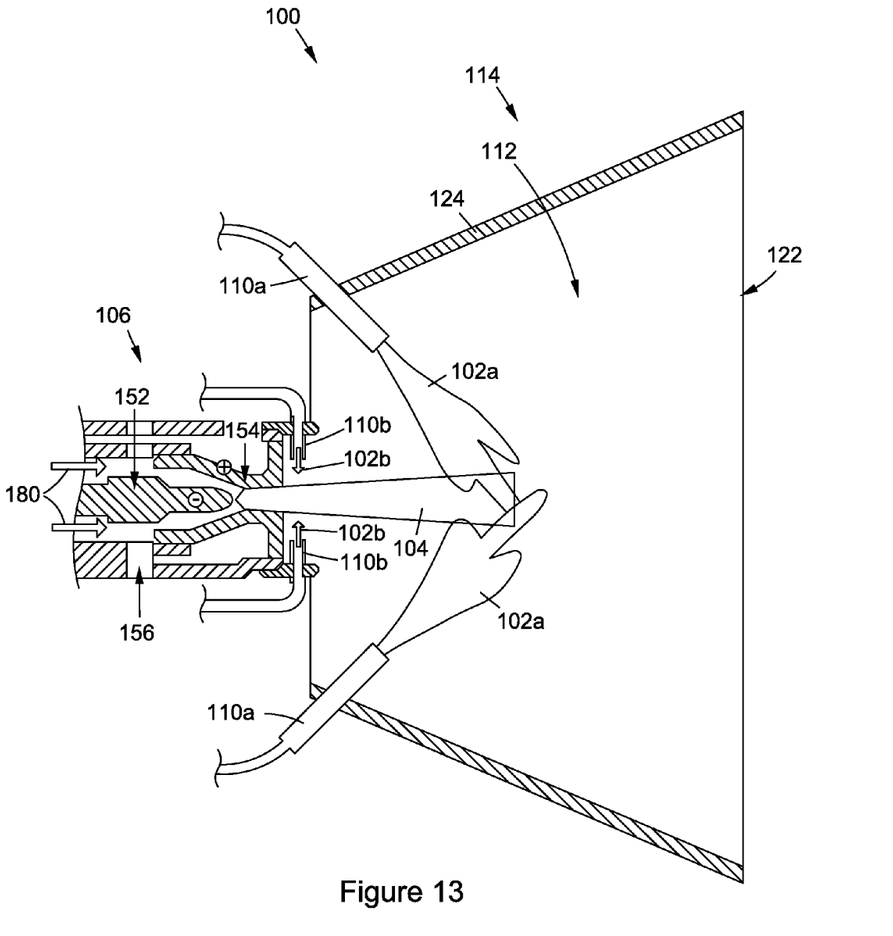
FIG. 13 is a schematic longitudinal cross-sectional view of an exemplifying propulsion system illustrating injection of reactants into a plasma flow in a downstream direction between 0 degrees and 90 degrees relative to a plasma flow direction or a central axis of a flow passage, and illustrating aspects of an exemplifying plasma generator, according to some aspects of the subject technology.

FIG. 13 shows a propulsion system 100 exemplifying some aspects of the subject technology. FIG. 13 is similar to FIG. 11 in some respects, and differs from FIG. 11 in some respects. The propulsion system 100 of FIG. 13 has two first reactant injectors 110a positioned and oriented to inject the first reactant 102a at an angle between 0 degrees and 90 degrees relative to a plasma flow direction or a central axis of the passage 108 (with a downstream component) into the divergent nozzle 114. The propulsion system 100 of FIG. 13 also has two second reactant injectors 110b positioned to inject the second reactant 102b into the plasma flow 104 just upstream of an upstream and of the divergent nozzle 114 and oriented at an angle generally perpendicular to a direction of the plasma flow 104, or nominally perpendicular to a central axis of the passage 108. The divergent nozzle 114 of FIG. 13 comprises a conical shell 124 surrounding the reaction chamber 112. In certain embodiments, the portion of the conical shell 104 surrounding the reaction chamber 112 may comprise other shapes so as to provide a reaction chamber 112 separate from a diverging portion of the passage formed by a conical portion adjacent to the exhaust port 122.

Figure 15:
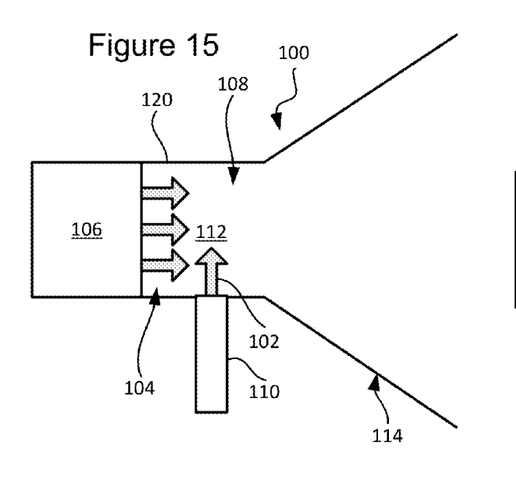
FIGS. 15-17 are schematic longitudinal cross-sectional views of exemplifying propulsion systems illustrating orientations of injector for delivering reactants into plasma flow, according to various aspects of the subject technology.

As an example, a propulsion system was configured as shown schematically in FIGS. 4 and 15, with a plasma generator 106 as illustrated in FIG. 11. Hydrogen peroxide delivered through the first reactant injector 110a and silver powder delivered through the second reactant injector 110b are injected into a supersonic region of the plasma flow 104.

The assembly was suspended via a series of cables and oriented to fire horizontally in ambient environment. Thrust measurements were made using a 5-pound force (lbf.) load cell. Flow rates of argon, silver, and hydrogen peroxide were recorded. A preliminary checkout run was initially performed to confirm that the system and diagnostics operate as expected, followed by a longer steady-state firing.

Figure 14:
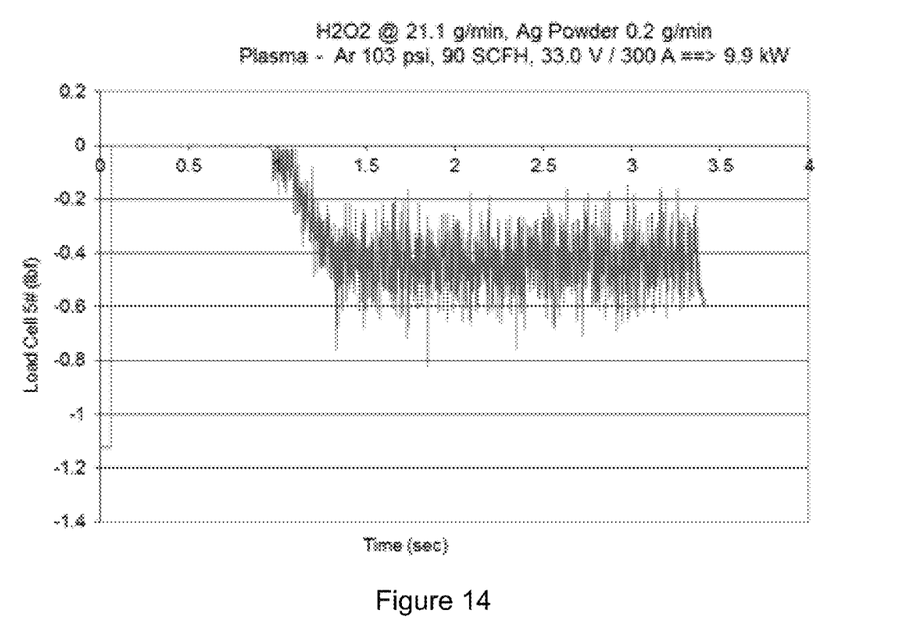
FIG. 14 is a plot of thrust (lbf.) over time (sec.) of an example propulsion system according to some aspects of the subject technology.

FIG. 14 shows the signal obtained from the load cell with thrust (lbf.) plotted against time (seconds). The data was obtained with the plasma gun set at a power level of 9.9 kW (33.0 Volts and 300 Amperes), an argon flow rate of 90 standard cubic feet per hour (SCFH) and a pressure of 103 pounds per square inch (psi). The flow rate of hydrogen peroxide (30% concentration) was 21.1 grams per minute (g/min). Silver power was injected at a rate of 0.2 g/min. As shown in FIG. 14, the thrust measured under these conditions was approximately 0.4 lbf., which corresponds to a specific impulse of just over 500 seconds under these conditions. For comparison, the specific impulse predicted for these conditions in the absence of plasma is between 150 and 200 seconds, and specific impulse of a typical hydrazine thruster is approximately 220 seconds. These results suggest that the propulsion system of this example, using a low concentration of hydrogen peroxide (30%) (a) can achieve performance comparable to that of a conventional 5.0 pound rocket engine assembly with sufficient available power, (b) at a fixed thrust level utilizes available power to gain significant improvements in specific impulse over a conventional 0.2 pound rocket engine assembly, and (c) can achieve specific impulse similar to that of a hydrazine arcjet.

In some aspects of the subject technology, a propellant having lower requirements for purity and, therefore, less expensive and easier to handle. For example, the efficiency of a hydrogen peroxide engine improves as purity of the propellant increases but the difficulty in managing the propellant also increases with increasing purity. The use of an electrically energized plasma spray of silver may allow an engine using hydrogen peroxide with a reduced level of purity to still achieve an Isp in the neighborhood of 500 seconds. In some aspects of the subject technology, hydrogen peroxide having a concentration of 90% or less, 70% or less, 50% or less, 40% or less, 30% or less, 20% or less, 10% or less, or 5% of less can be injected into the reaction chamber and reacted with a catalyst. Hydrogen peroxide is considered a green propellant, e.g. the reaction products are only water and oxygen, while hydrazine decomposes into ammonia. The cost of hydrogen peroxide is generally less than the cost of hydrazine. The ability to use hydrogen peroxide and achieve an Isp that was previously only available using hydrazine may allow hydrogen peroxide to be a more viable propellant.

In some aspects of the subject technology, propulsion systems can use a plasma sprayer to provide a flow of high-temperature, electrically energized particles of a catalyst into a flow of a propellant that disassociates into one or more reaction products in the presence of the catalyst. The introduction of the catalyst as a fine powder and presence of the high-temperature and electrically charged plasma may provide an increase in the Isp of the propellant and/or an overall improvement in the efficiency of the engine.

The description of the subject technology is provided to enable any person skilled in the art to practice the various aspects described herein. While the subject technology has been particularly described with reference to the various figures, aspects, and/or other examples, it should be understood that these are for illustration purposes only and should not be taken as limiting the scope of the subject technology. There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented. Thus, the claims are not intended to be limited to the aspects shown herein, but are to be accorded the full scope consistent with the language of the claims.

Headings and subheadings, if any, are used for convenience only and do not limit the invention, and are not referred to in connection with the interpretation of the description of the subject technology.

A reference to an element in the singular is not intended to mean "one and only one" unless specifically stated, but rather "one or more." Use of the articles "a" and "an" is to be interpreted as equivalent to the phrase "at least one." Unless specifically stated otherwise, the terms "a set" and "some" refer to one or more.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "upper," "lower," "left," "right," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Although the relationships among various components are described herein and/or are illustrated as being orthogonal or perpendicular, those components can be arranged in other configurations in some embodiments. For example, the angles formed between the referenced components can be greater or less than 90 degrees in some embodiments.

Although various components are illustrated as being flat and/or straight, those components can have other configurations, such as curved or tapered for example, in some embodiments.

Pronouns in the masculine (e.g., his) include the feminine and neuter gender (e.g., her and its) and vice versa. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "operation for."

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

Although embodiments of the present disclosure have been described and illustrated in detail, it is to be clearly understood that the same is by way of illustration and example only and is not to be taken by way of limitation, the scope of the present invention being limited only by the terms of the appended claims.

What is claimed is:

1. A propulsion system, comprising:
   a passage comprising a reaction chamber, the passage formed at least partially by a divergent nozzle;
   a plasma flow generator positioned upstream of the reaction chamber and configured to direct a flow of plasma downstream into the reaction chamber and through the divergent nozzle;
   a plurality of injectors positioned to deliver at least two chemically different reactants into the plasma flow at a region in the reaction chamber where the plasma flow is supersonic, wherein the plurality of injectors comprises a first injector configured to deliver a first of the at least two chemically different reactants separately from a second of the at least two chemically different reactants, and a second injector configured to deliver the second of the at least two chemically different reactants separately from the first of the at least two chemically different reactants;
   wherein at least one of the first of the at least two chemically different reactants and the second of the at least two chemically different reactants is a catalyst.

2. The propulsion system of claim 1, wherein the reaction chamber is at least partially within the divergent nozzle.

3. The propulsion system of claim 1, wherein the first of the at least two chemically different reactants is a propellant, the second of the at least two chemically different reactants is a catalyst, and the second injector is configured to spray the catalyst into the reaction chamber.

4. The propulsion system of claim 3, wherein the second injector is configured to spray the catalyst in powder form with a carrier gas.

5. The propulsion system of claim 1, wherein the first injector is positioned to deliver the first of the at least two chemically different reactants through an electrical arc of the plasma flow generator.

6. The propulsion system of claim 1, wherein the plurality of injectors comprises a plurality of first injectors and a plurality of second injectors.

7. The propulsion system of claim 1, wherein at least some of the plurality of injectors are configured to direct at least one of the at least two chemically different reactants in a direction parallel to a plasma flow axis.

8. The propulsion system of claim 1, wherein at least some of the plurality of injectors are configured to direct at least one of the at least two chemically different reactants in a direction oriented at an angle greater than 0 degrees and less than 90 degrees relative to a plasma flow axis.

9. The propulsion system of claim 8, wherein the direction is oriented downstream.

10. The propulsion system of claim 1, wherein at least some of the plurality of injectors are positioned to deliver at least one of the at least two chemically different reactants into the reaction chamber upstream of the divergent nozzle.

11. The propulsion system of claim 10, wherein all of the plurality of injectors are positioned to deliver all of the at least two chemically different reactants into the reaction chamber upstream of the divergent nozzle.

12. The propulsion system of claim 3, wherein the second injector is positioned (i) at the same longitudinal position as the first injector, or (ii) upstream relative to the first injector.

13. A method of generating thrust, the method comprising:
   directing a plasma flow downstream into a reaction chamber;
   injecting a first reactant to the plasma flow at a region in the reaction chamber where the plasma flow is supersonic;
   injecting a second reactant, separately from the first reactant, to the plasma flow at the region in the reaction chamber where the plasma flow is supersonic, the second reactant being chemically different from the first reactant;
   reacting the first reactant and the second reactant in the supersonic plasma flow to generate combustion ionization;
   accelerating combustion byproducts through a divergent nozzle,
   wherein at least one of the reactants is a catalyst.

14. The method of claim 13, wherein injecting the first reactant comprises injecting a propellant, injecting the second reactant comprises spraying a catalyst, and the catalyst is injected into the plasma flow (i) at the same longitudinal position as where the propellant is injected, or (ii) upstream of where the propellant is injected.

15. The method of claim 14, wherein spraying the catalyst comprises spraying the catalyst in powder form with a carrier gas.

16. The method of claim 14, wherein injecting the propellant comprises injecting hydrogen peroxide, and spraying the catalyst comprises spraying particulate silver in a carrier gas.

17. The method of claim 13, wherein injecting the first reactant comprises injecting a propellant, and injecting the second reactant comprising injecting an oxidizer.

18. The method of claim 13, wherein at least one of the first reactant and the second reactant is injected into an electrical arc in the plasma flow.

19. The method of claim 13, wherein at least one of the first reactant and the second reactant is injected in a downstream direction relative to the plasma flow.

20. The method of claim 19, wherein at least one of the first reactant and the second reactant is injected coaxially with the plasma flow.

21. The method of claim 13, wherein at least one of the first reactant and the second reactant is injected in a direction normal to a plasma flow axis.

22. A propulsion system, comprising:
   a passage comprising a reaction chamber, the passage formed at least partially by a divergent nozzle;
   a plasma flow generator positioned to direct a flow of plasma into the reaction chamber and through the divergent nozzle;
   a plurality of injectors positioned to deliver at least two chemically different reactants into the plasma flow at a region in the reaction chamber where the plasma flow is supersonic, wherein the plurality of injectors comprises a first injector configured to deliver a first of the at least two reactants separately from a second of the at least two reactants, and a second injector configured to deliver the second of the at least two reactants separately from the first of the at least two reactants;
   wherein at least some of the plurality of injectors are configured to direct at least one of the reactants in a direction normal to a plasma flow axis.

* * * * *